(12) United States Patent
Sim et al.

(10) Patent No.: US 11,668,486 B2
(45) Date of Patent: *Jun. 6, 2023

(54) METHOD FOR AIR CONDITIONING AND AIR CONDITIONER BASED ON THERMAL COMFORT

(71) Applicant: LG ELECTRONICS INC., Seoul (KR)

(72) Inventors: Soo Young Sim, Seoul (KR); Beom Oh Kim, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 544 days.

This patent is subject to a terminal disclaimer.

(21) Appl. No.: 16/779,162

(22) Filed: Jan. 31, 2020

(65) Prior Publication Data
US 2021/0003309 A1    Jan. 7, 2021

(30) Foreign Application Priority Data
Jul. 5, 2019  (KR) .................... 10-2019-0081421

(51) Int. Cl.
*F24F 11/64*  (2018.01)
*G06N 3/08*  (2023.01)
(Continued)

(52) U.S. Cl.
CPC ............... *F24F 11/64* (2018.01); *G06N 3/08* (2013.01); *F24F 2110/10* (2018.01); *F24F 2120/10* (2018.01)

(58) Field of Classification Search
CPC .... F24F 11/64; F24F 2120/10; F24F 2110/10; F24F 11/30; G06N 3/08; B60H 1/00742
See application file for complete search history.

(56) References Cited

U.S. PATENT DOCUMENTS

2004/0060311 A1* 4/2004 Imoto ................ F24F 11/30
62/244
2007/0173727 A1* 7/2007 Naghavi ............ A61B 5/6838
600/549

(Continued)

FOREIGN PATENT DOCUMENTS

CN       206877341 U  *  1/2018
KR    10-2017-0129454      11/2017
KR    10-2019-0035007       4/2019

OTHER PUBLICATIONS

Moon, J.W. and Jung, S.K., 2016. Development of a thermal control algorithm using artificial neural network models for improved thermal comfort and energy efficiency in accommodation buildings. Applied Thermal Engineering, 103, pp. 1135-1144. (Year: 2016).*

(Continued)

*Primary Examiner* — Alicia M. Choi
(74) *Attorney, Agent, or Firm* — Lee, Hong, Degerman, Kang & Waimey PC

(57) ABSTRACT

A thermal comfort-based air conditioning method according to an embodiment of the present disclosure includes, in a 5G network environment, estimation of a thermal comfort of a human body based on a thermal image by using an artificial neural network (ANN) that performs deep learning, and includes air conditioning control based on thermal comfort information. According to embodiments of the present disclosure, it is possible to prevent discomfort caused by heat or cold due to excessive or insufficient air conditioning control.

12 Claims, 13 Drawing Sheets

(51) Int. Cl.
  *F24F 120/10* (2018.01)
  *F24F 110/10* (2018.01)

(56) References Cited

U.S. PATENT DOCUMENTS

| | | | | |
|---|---|---|---|---|
| 2007/0299322 | A1* | 12/2007 | Miyajima | A61B 5/0533 600/301 |
| 2008/0077044 | A1* | 3/2008 | Nakayama | A61B 5/01 600/549 |
| 2012/0095303 | A1* | 4/2012 | He | A61B 5/01 600/301 |
| 2014/0148706 | A1* | 5/2014 | Van Treeck | A61B 5/0077 600/474 |
| 2015/0204556 | A1* | 7/2015 | Kusukame | F24F 11/30 250/338.3 |
| 2016/0363340 | A1* | 12/2016 | Shikii | F24F 11/62 |
| 2018/0153457 | A1* | 6/2018 | Montoya | G08B 13/19682 |
| 2020/0331319 | A1* | 10/2020 | Wang | B60H 1/00742 |

OTHER PUBLICATIONS

Liu, W., Lian, Z. and Zhao, B., 2007. A neural network evaluation model for individual thermal comfort. Energy and Buildings, 39(10), pp. 1115-1122. (Year: 2007).*

* cited by examiner

METHOD FOR AIR CONDITIONING AND AIR CONDITIONER BASED ON THERMAL COMFORT

CROSS-REFERENCE TO RELATED APPLICATION

Pursuant to 35 U.S.C. § 119(a), this application claims the benefit of earlier filing date and right of priority to Korean Patent Application No. 10-2019-0081421, filed on Jul. 5, 2019, the contents of which are hereby incorporated by reference herein in its entirety.

BACKGROUND

1. Technical Field

The present disclosure relates to a thermal comfort-based air conditioning method and air conditioner. More particularly, the present disclosure relates to a method for controlling air conditioning based on different individual thermal comforts, and an air conditioner using the same.

2. Description of Related Art

An air conditioner is an apparatus to control a temperature, humidity, a cleanliness, and/or distribution of air currents, and may be configured to include an indoor unit, an outdoor unit, and an air conditioning controller that controls air conditioning of the indoor unit and the outdoor unit. An air conditioning system including one or more air conditioners may be configured, and may include a plurality of indoor units and a plurality of outdoor units.

Korean Patent Application Publication (hereinafter referred to as "Related Art 1") discloses an artificial intelligence (AI) air conditioning apparatus and a control method thereof. According to Related Art 1, a body position of a human body is recognized, and air conditioning is controlled based on the body position. For example, an air discharge angle and an air discharge amount are controlled differently depending on whether a person is lying, sitting, or standing. However, Related Art 1 does not consider a cold feeling or warm feeling that people directly feel on their skin according to temperature, humidity, air current, clothes, and metabolic rate, and thus does not maintain a proper thermal comfort.

In addition, Korean Patent Application Publication hereinafter referred to as "Related Art 2") discloses an air conditioner and an operating method thereof. According to this related art, an air volume and an ON/OFF state of a compressor are controlled based on a human body density level. However, in Related Art 2, air conditioning is uniformly controlled simply according to the number of people, and thus Related Art 2 does not maintain a proper thermal comfort for each individual.

SUMMARY OF THE INVENTION

The present disclosure is directed to addressing the issue associated with the related art discussed above in which air conditioning is controlled according to a type of body position, while not considering individual thermal comfort.

The present disclosure is further directed to addressing the issue associated with the related art discussed above in which air conditioning is controlled according to the number of human bodies counted, while not considering a thermal resistance of a user's clothing during the summer or winter.

The present disclosure is further directed to addressing the issue in which air conditioning is controlled regardless of whether each individual feels discomfort due to excessive or insufficient cooling or heating.

However, the present disclosure is not limited to what has been described above, and other aspects and advantages not mentioned herein may be clearly understood from embodiments of the present disclosure. In addition, it will be appreciated that the aspects and advantages of the present disclosure will be easily realized by those skilled in the art based on the appended claims and a combination thereof.

A thermal comfort-based air conditioning control method according to an embodiment of the present disclosure may be configured to include acquiring a thermal image of an air conditioning space by using an image sensor, acquiring thermal comfort information of a human body by using the thermal image, and controlling air conditioning of the air conditioning space based on the thermal comfort information.

In addition, the acquiring the thermal comfort information of the human body by using the thermal image may be configured to include recognizing a human body region in the thermal image, extracting a skin temperature feature by using a temperature of the human body region, estimating a thermal comfort of a human body through an analysis of the skin temperature feature, and extracting thermal comfort information based on the estimated thermal comfort.

In addition, the recognizing the human body region in the thermal image may include recognizing a human body region by using a temperature feature of a moving subject.

In addition, the extracting the skin temperature feature may include extracting a skin temperature feature of a human body part based on dilation or constriction of a shunt vessel.

In addition, the extracting the skin temperature feature may include extracting a skin temperature feature of at least one of a forehead and a hand.

In addition, the extracting the skin temperature feature may include extracting a skin temperature feature based on at least one among a finger skin temperature, a difference in a skin temperature between a finger and a palm, and a size of a specific frequency region.

In addition, to estimate the thermal comfort of the human body through the analysis of the skin temperature feature, sensing information about at least one among a temperature, humidity, and wind strength may be used.

In addition, to estimate the thermal comfort of the human body through the analysis of the skin temperature feature, a thermal resistance according to a clothing condition of a human body may be used.

In addition, to acquire the thermal comfort information of the human body by using the thermal image, an artificial intelligence (AI) model which extracts thermal comfort information of a human body based on an analysis of a human body skin temperature feature may be used. The AI model may correspond to a model that is trained, with respect to training data, to extract a skin temperature feature based on at least one among a finger skin temperature, a difference in a skin temperature between a finger and a palm, and a size of a specific frequency region, and to extract thermal comfort information of a human body based on the skin temperature feature.

The AI model may be to a model that is trained to extract a skin temperature feature based on a thermal resistance according to a clothing condition of a human body, and to extract thermal comfort information of the human body based on the skin temperature feature.

A thermal comfort-based air conditioner according to another embodiment of the present disclosure may be configured to include a thermal sensor configured to scan a thermal image, and a processor configured to control an operation of the thermal sensor. In addition, the processor may recognize a human body displayed on the thermal image, acquire thermal comfort information of the human body, and control air conditioning of an air conditioning space based on the thermal comfort information.

A thermal comfort-based air conditioning method comprises acquiring a thermal image of an air conditioning space via an image sensor; acquiring thermal comfort information of a human body within the air conditioning space based on the thermal image; and controlling air conditioning of the air conditioning space based on the thermal comfort information.

The acquiring the thermal comfort information of the human body based on the thermal image comprises recognizing a human body region in the thermal image; extracting a skin temperature feature based on a temperature of the human body region; estimating a thermal comfort of a human body based on an analysis of the skin temperature feature; and extracting thermal comfort information based on the estimated thermal comfort.

The recognizing the human body region in the thermal image is based on a temperature feature of a moving subject.

The extracting the skin temperature feature is based on dilation or constriction of a shunt vessel.

The extracting the skin temperature feature is based on a skin temperature feature of at least a forehead or a hand of the human body.

The extracting the skin temperature feature is based on at least one of a finger skin temperature, a difference in a skin temperature between a finger and a palm, or a size of a specific frequency region.

The estimating the thermal comfort of the human body comprises using sensing information about at least one of a temperature, a humidity, or a wind strength.

The estimating the thermal comfort of the human body comprises using a thermal resistance according to a clothing condition of the human body.

The acquiring the thermal comfort information of the human body comprises using an artificial intelligence (AI) model which extracts thermal comfort information of the human body based on an analysis of a human body skin temperature feature; and the AI model is trained to extract a skin temperature feature based on at least one of a finger skin temperature, a difference in a skin temperature between a finger and a palm, or a size of a specific frequency region, and to extract thermal comfort information of the human body based on the skin temperature feature.

The AI model is trained to extract a skin temperature feature based on a thermal resistance according to a clothing condition of the human body, and to extract thermal comfort information of the human body based on the skin temperature feature.

A thermal comfort-based air conditioner comprises a thermal sensor configured to acquire a thermal image of an air conditioning space; and a processor configured to recognize a human body depicted in the thermal image acquired by the thermal sensor; acquire thermal comfort information of the human body; and control air conditioning of the air conditioning space based on the thermal comfort information.

The processor is further configured to extract a skin temperature feature by using a temperature of a human body region in the thermal image; estimate a thermal comfort of the human body through an analysis of the skin temperature feature; and extract thermal comfort information based on the estimated thermal comfort.

The processor is further configured to recognize the human body region based on a temperature feature of a moving subject.

The processor is further configured to extract a skin temperature feature of a human body part based on dilation or constriction of a shunt vessel.

The processor is further configured to extract a skin temperature feature of at least a forehead or a hand of the human body.

The processor is further configured to extract the skin temperature feature based on at least one of a finger skin temperature, a difference in a skin temperature between a finger and a palm, or a size of a specific frequency region.

The processor is further configured to estimate the thermal comfort of the human body based on sensing information about at least one of a temperature, a humidity, or a wind strength.

The processor is further configured to estimate the thermal comfort of the human body based on a thermal resistance according to a clothing condition of the human body.

The processor is further configured to utilize an artificial intelligence (AI) model which extracts thermal comfort information of the human body based on an analysis of a human body skin temperature feature; and the AI model is trained to extract a skin temperature feature based on at least one of a finger skin temperature, a difference in a skin temperature between a finger and a palm, or a size of a specific frequency region, and to extract thermal comfort information of the human body based on the skin temperature feature.

The AI model is trained to extract a skin temperature feature based on a thermal resistance according to a clothing condition of the human body, and to extract thermal comfort information of the human body based on the skin temperature feature.

According to embodiments of the present disclosure, a feeling of discomfort caused by heat or cold due to excessive or insufficient air conditioning control may be prevented.

According to embodiments of the present disclosure, a state in which each individual feels thermal comfort may be maintained through air conditioning control.

Effects according to embodiments of the present disclosure are not limited to the effects described above.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
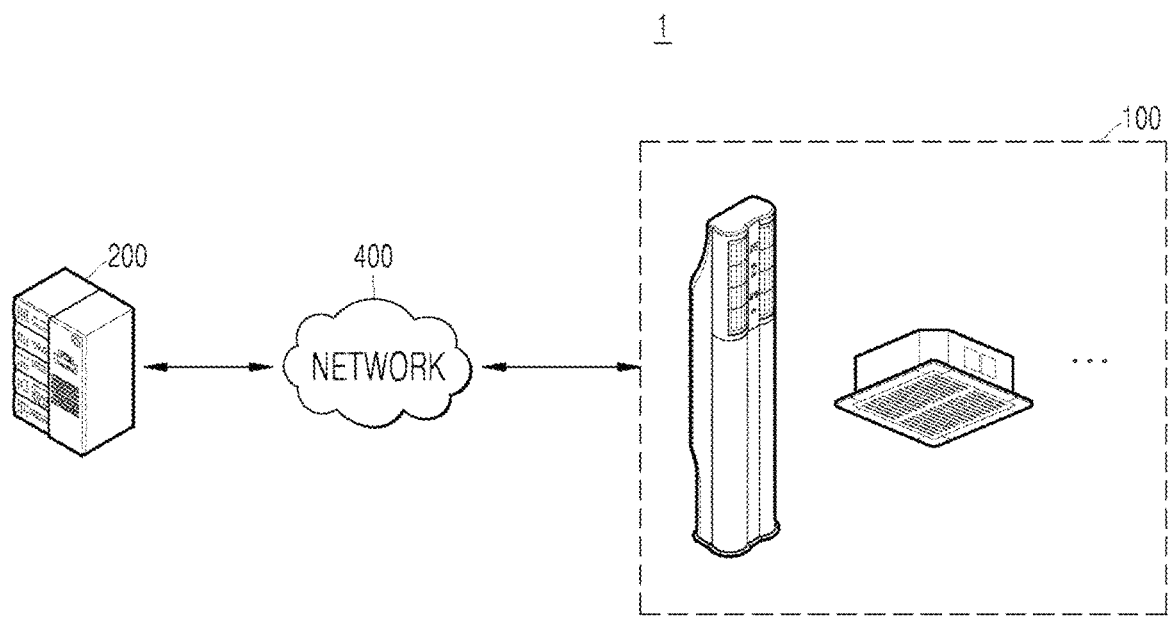
FIG. 1 is an exemplary view illustrating a network environment connected to an air conditioner according to an embodiment of the present disclosure.

Hereinbelow, embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for the purpose of simplifying the description of the present disclosure, and therefore, the suffix itself will not be used to differentiate the significance or function or the corresponding term. Further, in the description of the embodiments of the present disclosure, when it is determined that the detailed description of the related art would obscure the gist of the present disclosure, the description thereof will be omitted. Also, the accompanying drawings are provided only to facilitate understanding of the embodiments disclosed in the present disclosure and therefore should not be construed as being limiting in any way. It should be understood that all modifications, equivalents, and replacements which are not exemplified herein but are still within the spirit and scope of the present disclosure are to be construed as being included in the present disclosure.

The terms such as "first," "second," and other numerical terms may be used herein only to describe various elements and only to distinguish one element from another element, and as such, these elements should not be limited by these terms.

It will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

An air conditioner according to an embodiment of the present disclosure is an apparatus having a function of controlling a state of air, and may be configured to include an air conditioner indoor unit and an air conditioner outdoor unit. An apparatus used exclusively for cooling, called an "air-con", may be included within the scope of the air conditioner according to an embodiment of the present disclosure, and a heat pump, which is capable of performing cooling and heating and also has a hot water supply function depending on whether facilities exist, may also be included within the scope of the air conditioner according to an embodiment of the present disclosure.

The heat pump is related to an action of absorbing heat in a low temperature range, for example, heat of air and heat of ground water, and waste heat, and pumping the heat up to a high temperature range.

The heat pump is a kind of air conditioner that performs a function of changing an energy state by pumping low-temperature and low-density heat energy up to a high-temperature and high-density heat energy. The heat pump performs cooling, heating, and hot water supply by using heat generated during a process of changing a low temperature to a high temperature or changing a high temperature to a low temperature.

The air conditioner according to an embodiment of the present disclosure is based on a concept including one or more air conditioner indoor units, one or more air conditioner outdoor units operating in connection with the air conditioner indoor units, a controller configured to control the air conditioner indoor units and the air conditioner outdoor units, and a wireless controller that corresponds to the controller, that is, a remote control.

An air conditioning system is based on a concept including one or more air conditioner indoor units, one or more air conditioner outdoor units operating in connection with the air conditioner indoor units, a plurality of controllers that control the air conditioner indoor units and the air conditioner outdoor units, wireless controllers corresponding to the controllers, and a central controller that controls all the air conditioner indoor units and the air conditioner outdoor units. The air conditioning system may be described as a concept including a plurality of air conditioners according to an embodiment of the present disclosure, and a central controller that controls the plurality of air conditioners.

The air conditioning system may be a system for realizing air conditioning such as cooling or heating in a target space included in a structure, for example, a house, a building, a factory, and public facilities. That is, the air conditioning system may be applied to a target space where a plurality of air conditioner indoor units is required, and facilities where a plurality of target spaces are formed.

FIG. 1 is an exemplary view illustrating a network environment connected to an air conditioner according to an embodiment of the present disclosure.

Referring to FIG. 1, an air conditioner 100 according to an embodiment of the present disclosure may communicate with a server 200 via a network 400. Specifically, the air conditioner 100 may transmit a variety of data to the server 200, and receive a variety of data from the server 200. For example, the server 200 may receive data that is to be used as training data from the air conditioner 100, and the air conditioner 100 may transmit user log data as training data to the server 200.

In addition, the air conditioner 100 may perform, via communication with the server 200, a process of generating, maintaining, and updating various programs associated with an artificial intelligence (AI) model capable of estimating a thermal comfort according to an embodiment of the present disclosure. Accordingly, the server 200 may provide some or all of the programs to the air conditioner 100 via communication connection.

Furthermore, when communication between the air conditioner 100 according to an embodiment of the present disclosure and the server 200 is not connected, the air conditioner 100 may estimate a thermal comfort of a user by using the AI model stored in a memory in a local region to which the air conditioner 100 belongs, in the same manner as when online.

Referring back to FIG. 1, an air conditioner indoor unit representative of the air conditioner 100 is illustrated, but the shape of the air conditioner 100 according to an embodiment of the present disclosure is not limited to that of FIG. 1. That is, as an air conditioner indoor unit, a ceiling-embedded type air conditioner, a stand type air conditioner, and air conditioners with the other shapes may be included within the scope of the air conditioner 100.

The server 200 may provide the air conditioner 100 with a program that is required for generation and training of an AI model capable of estimating a thermal comfort according to an embodiment of the present disclosure. Alternatively, the server 200 may directly generate and train the AI model, and then provide the completed AI model to the air conditioner 100. In addition, the server 200 may collect data that is to be used for training of the AI model in the form of log data of a user who uses a plurality of air conditioners 100, that is, the air conditioner 100.

The server 200 may include a single computing device that performs functions associated with generation and training of an AI model for estimation of a thermal comfort according to an embodiment of the present disclosure, and associated with collection of data for training, or include a plurality of computing devices that perform each of the functions.

The network 400 may be a wired and wireless network, for example, a local area network (LAN), a wide area network (WAN), Internet, an intranet and an extranet, and any suitable communication network including a mobile network, such as cellular, 3G, long term evolution (LTE), 5G, and Wi-Fi networks, ad hoc networks, and a combination of the listed networks.

The network 400 may include a connection of network elements, such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks.

Hereinafter, components of the air conditioner 100 according to an embodiment of the present disclosure will be described.

Figure 2:
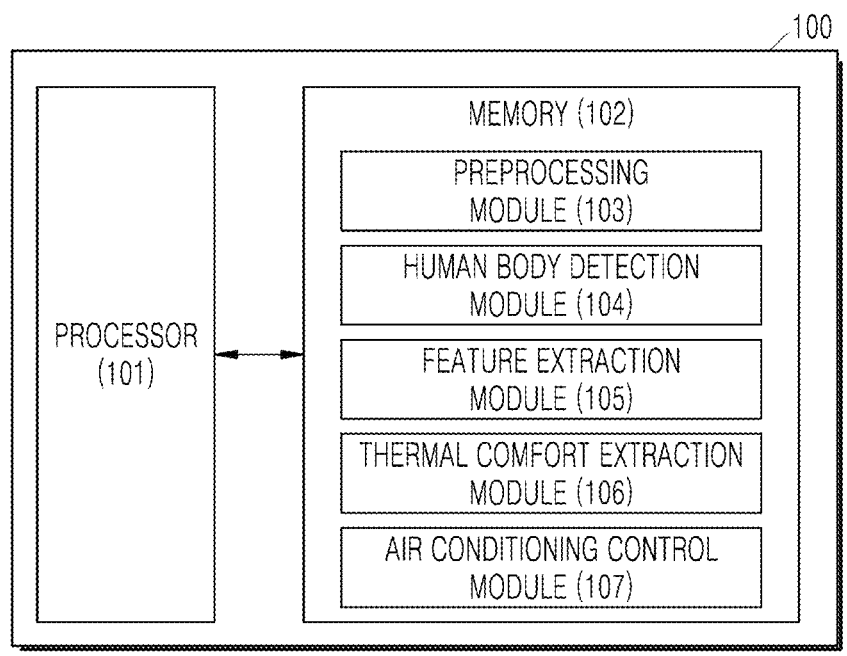
FIG. 2 is a block diagram illustrating components of an air conditioner according to an embodiment of the present disclosure.

FIG. 2 is a block diagram illustrating components of an air conditioner according to an embodiment of the present disclosure.

Referring to FIG. 2, an air conditioner 100 according to an embodiment of the present disclosure may be an apparatus that performs various air conditioning controls required for air conditioning, and may be configured to include a processor 101 and a memory 102. In addition, the memory 102 may be configured to include a preprocessing module 103, a human body detection module 104, a feature extraction module 105, a thermal comfort extraction module 106, and an air conditioning control module 107.

Figure 3:
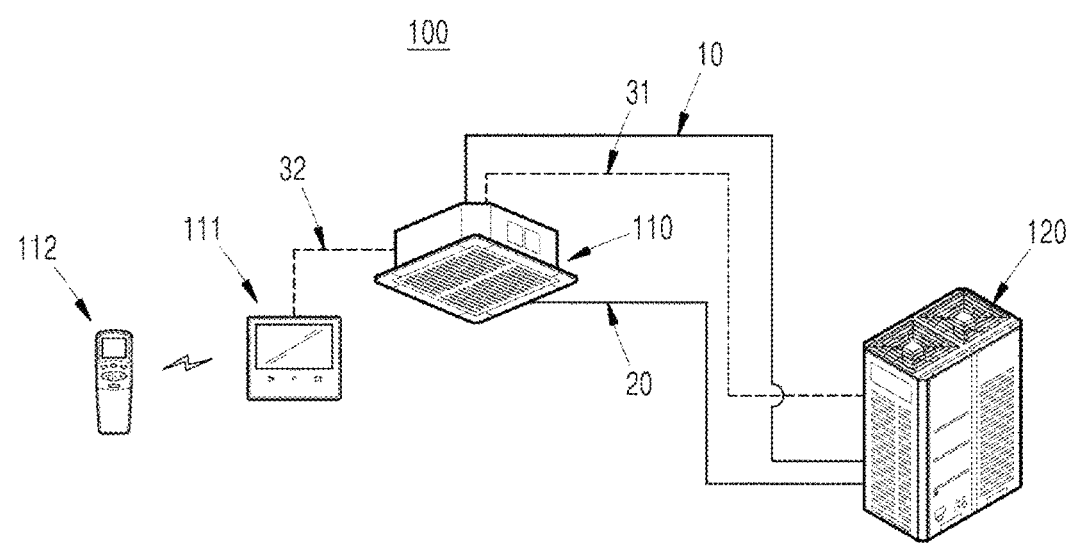
FIG. 3 is an exemplary view illustrating a ceiling embedded-type air conditioner, among air conditioners according to an embodiment of the present disclosure.

FIG. 3 is an exemplary view illustrating a ceiling embedded-type air conditioner, among air conditioners according to an embodiment of the present disclosure.

Referring to FIG. 3, an air conditioner 100 may be configured to include an air conditioner indoor unit 110, an air conditioner outdoor unit 120, a controller 111, and a remote control 112 in terms of external shapes thereof.

Referring to FIGS. 2 and 3, the processor 101 and the memory 102, among various components constituting the air conditioner 100, may be implemented in the form of a printed circuit board (PCB), and may be included in at least one among the air conditioner indoor unit 110, the controller 111, and the remote control 112. In this case, in response to a command to control the air conditioner 100 generated by an interaction between the processor 101 and the memory 102, the air conditioner indoor unit 110 and the air conditioner outdoor unit 120 which are physically and functionally connected to one another through refrigerant circuits 10 and 20 and control circuits 31 and 32 may be controlled.

A function of estimating thermal comfort and controlling air conditioning based on information about the estimated thermal comfort, among various control functions of the air conditioner 100, may be based on a thermal image collected by a camera. Accordingly, a camera that is a basis of estimation of a thermal comfort, the processor 101 that estimates a thermal comfort and controls air conditioning based on the estimated thermal comfort, and the memory 102 may be located near to one another. For example, the processor 101, the memory 102, and the camera, in particular, a thermal sensor corresponding to a key component thereof, may be included in the air conditioner indoor unit 110 of the ceiling embedded-type air conditioner.

In addition, a camera independent of the air conditioner 100 may be installed in a position independent of the air conditioner 100, and may acquire a thermal image with respect to a human body, and store the thermal image in the memory 102 of the air conditioner 100, and the processor 101 may process the stored thermal image.

The thermal comfort-based air conditioner 100 according to an embodiment of the present disclosure may include a means to perform air conditioning control which satisfies a thermal comfort based on individual thermal comfort information. That is, the air conditioner 100 may include a device required to control an air current discharge angle and an air current discharge amount, in order to control an intensity and a direction of an air current differently for each partitioned air conditioning space.

Figure 4A:
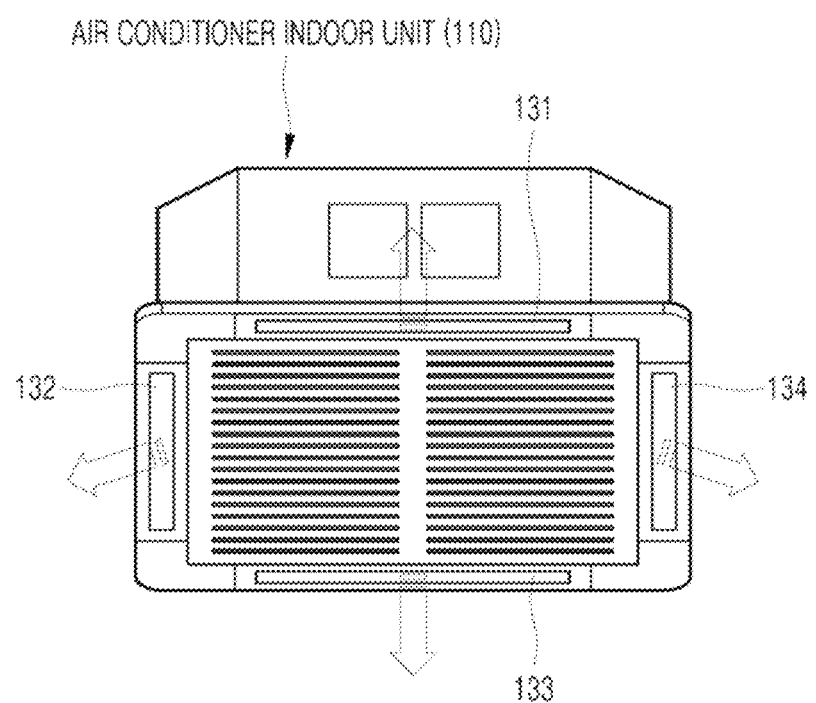
FIGS. 4A and 4B are exemplary views illustrating air conditioning by an air conditioner indoor unit illustrated in FIG. 3.
Figure 4B:
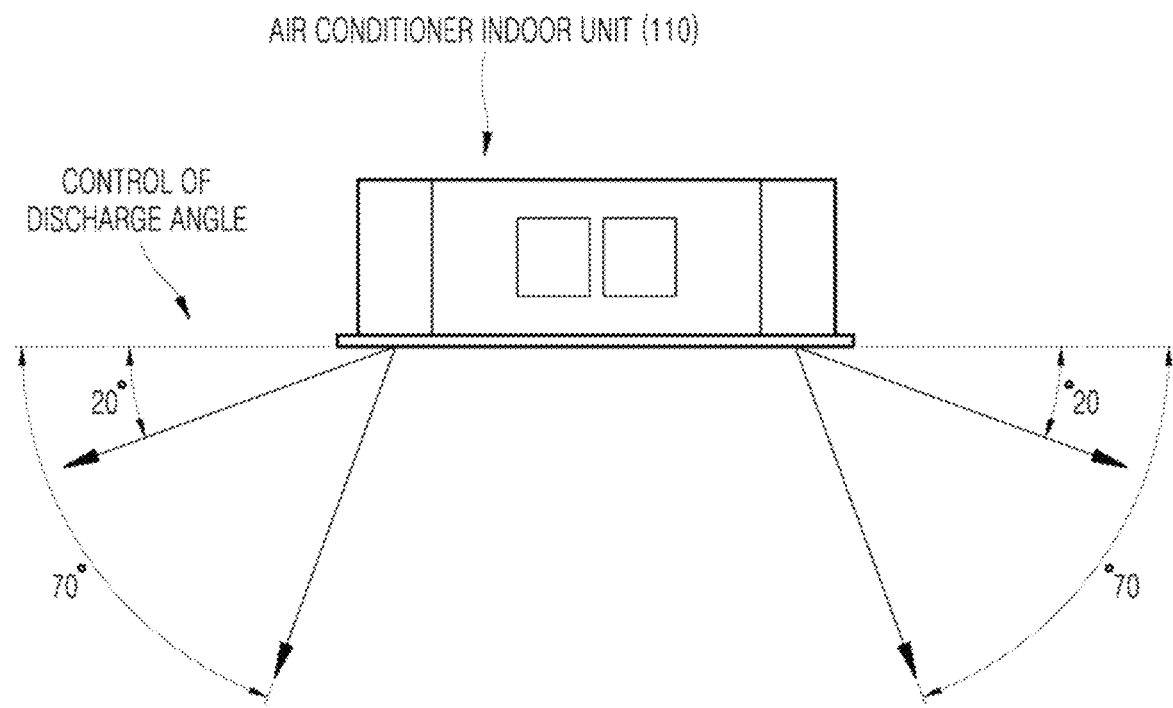

FIGS. 4A and 4B are exemplary views illustrating air conditioning by the air conditioner indoor unit 110 illustrated in FIG. 3.

FIG. 4A illustrates the air conditioner indoor unit 110 according to an embodiment of the present disclosure. The air conditioner indoor unit 110 may include vanes 131, 132, 133, and 134 in a plurality of directions, for example, four directions. In addition, a discharge amount and discharge angle of air discharged through each vane may be independently controlled.

FIG. 4B schematically illustrates discharge angles of air discharged through the vanes 132 and 134, among the four vanes. Here, a range of the discharge angles may be controlled by an operation of an actuator included in the air conditioner indoor unit 110.

A discharge angle of 20 degrees to 70 degrees may be formed, but is not necessarily limited thereto. An air discharge by a discharge angle exceeding 70 degrees may be disadvantageous in the case when air is discharged directly to a human body, or in terms of air circulation. A discharge angle less than 20 degrees requires high costs for implementation, while not having a significant air conditioning effect.

At a relatively small discharge angle, the air conditioner indoor unit 110 may emit conditioned air to an air conditioning space which is far away from the air conditioner indoor unit 110.

At a relatively large discharge angle, a degree of concentration of air conditioning may increase. Thus, the air conditioner indoor unit 110 may control a direction in which an air current is discharged, and a point at which the air current reaches a bottom on an air conditioning space, by adjusting an intensity and a discharge angle of the air current.

Referring back to FIG. 2, a control command or control logic included in the preprocessing module 103, the human body detection module 104, the feature extraction module 105, and the thermal comfort extraction module 106 which are included in the memory 102 may be executed through an operation of the processor 101, so that the air conditioner 100 may perform functions related to the above modules, and control air conditioning through the above process.

The processor 101 may be set to control driving of the air conditioner indoor unit 110 based on information about the air conditioner indoor unit 110 and sensing information collected by various sensors. Here, human body thermal image information and air condition information may be included within the scope of the sensing information.

The human body thermal image information may be based on a thermal image acquired by a thermal infrared camera including a thermal sensor. The human body thermal image information may be set to include information about a detected human body region, and temperature information of a specific part in the human body region, that is, a skin temperature feature of a body part, such as a forehead or a hand.

The thermal infrared camera may generate a visible thermal image that may be displayed on a screen in a consistent manner by means of the thermal sensor and circuitry. The thermal infrared camera may output a thermal image that shows a temperature according to a thermal distribution of a subject.

A lens of the thermal infrared camera may focus on an object or a specific area. The lens of the thermal infrared camera may focus on infrared rays emitted by all objects within a field of view of the lens, and scan light by using an infrared detector included in the thermal infrared camera.

A thermal detector included in the thermal infrared camera may generate a detailed temperature pattern, called a thermal image, within 1 second. In addition, temperature information may be collected at thousands of points in a field of view of the thermal detector.

A thermal image generated by an element of a camera may be converted to an electric signal (impulse). The electric signal may be sent to a special circuit board with a chip that converts information of visible data of a detector element in a display of a camera or in a separate display. The special circuit board may generate thermal images of various colors according to an intensity of infrared radiation. As the temperature increases, colors may become brighter.

Light scanning, condensing, detection, amplification, displaying, and a synchronization process of scanning and displaying may be performed in generation of a thermal image. The thermal infrared camera may be controlled by the processor 101 included in the air conditioner 100, and by an independent processor.

The processor 101 may include, for example, a microprocessor, and a central processing unit. A controller including the processor 101 and the memory 102 may be implemented as an embedded system.

The memory 102 may be set to store the preprocessing module 103, the human body detection module 104, the feature extraction module 105, the thermal comfort extraction module 106 and the air conditioning control module 107. Here, various modules may be implemented as software in which the modules are set to be loaded and unloaded into the memory 102, or as integrated circuit-type hardware.

The memory 102 may include, for example, a volatile memory, and a nonvolatile memory. The nonvolatile memory may be used as a storage device. The memory 102 may store at least one piece of software. Software may include an operating system (OS), a system program, and a variety of application programs. The application programs are the preprocessing module 103, the human body detection module 104, the feature extraction module 105, the thermal comfort extraction module 106, and the air conditioning control module 107.

The preprocessing module 103, the human body detection module 104, the feature extraction module 105, and the thermal comfort extraction module 106 may be set to include an instruction set for each function of a thermal comfort-based air conditioning method according to an embodiment of the present disclosure. Functions of the respective modules may be performed by the air conditioner 100 in a process in which various logic circuits included in the processor 101 read and execute various instruction sets of the modules loaded into the memory 102.

The preprocessing module 103 may serve to preprocess a thermal image. Here, preprocessing may include, for example, preprocessing raw data, extracting a human body part according to detection of a human body, and preprocessing the human body part. A preprocessing process may be configured to include a noise removal process, and an image brightness control process.

The human body detection module 104 may serve to detect a human body region from an acquired thermal image, and detect a human body part. The human body detection module 104 may detect a forehead, and a hand where a large number of shunt vessels, which are suitable for determining a thermal comfort, are distributed, among various human body parts.

According to embodiments of the present disclosure, various face recognition algorithms may be applied to detection of a human body region, rather than being directly used for the detection. Examples of the face recognition algorithms will be described below.

One existing face recognition method involves comparing an input image with a reference image stored in a database based on geometrical features of a face, and determining whether the input image matches the reference image. In this method, due to the three-dimensional and rotatable nature of faces, an application thereof is limited.

An Eigenfaces algorithm was developed by Pentland in 1991. Principal component analysis (PCA) is applied to extraction of a feature point, and Euclidean distance is applied to measurement of a similarity. The Eigenfaces algorithm is sensitive to a variation in environment or lighting, but is one among methods that are widely used and have proven performance.

A Fisherfaces algorithm is a face recognition method in which a Fisher linear discriminant (FLD) is applied as a classification algorithm. Since the Fisherfaces algorithm, learns each individual characteristic and is insensitive to environment changes, and is thus more accurate, it may be applied in real time in an online state.

Another algorithm is one based on a support vector machine (SVM). Such an algorithm uses PCA and an SVM algorithm. This algorithm exhibits a relatively high recognition rate, but has a disadvantage in that a large amount of time and memory are consumed for application to a multi-class, such as face recognition. However, this algorithm is one among algorithms that have been heavily studied in recent years.

Another method is one of recognizing a face by using a neural network. In a black and white still image, a face shape trained by using a sliding window is retrieved by the neural network. Extraction of two or more faces is also possible, but the speed is low and it is difficult to perform learning.

Another method is one of recognizing a face by using fuzzy logic and a neural network. A fuzzy membership function, instead of a brightness value of a pixel, is used as an input of a circuit of a neural network. This algorithm has better performance than a method that uses only a neural network, but a processing speed is low.

Another algorithm is a face recognition algorithm that uses Wavelet and Elastic Matching. This algorithm uses a frequency conversion, and is effective in processing of a change in a body position and a facial expression. However, this algorithm requires a large amount of calculation relative to recognition rate.

In comparison to human body identification, human body detection is required in an embodiment of the present disclosure. Thus, various human body recognition algorithms described above may be applied, but a human body region may be detected by detecting a moving subject with a possible body temperature distribution of a person.

When a human body region is detected from a thermal infrared image, positions of various body parts, for example, a head and a hand, may be recognized through a human body shape learning process. Compared to recognition of a gesture by a finger shape, a region of a hand in particular needs to be detected. Thus, a hand region may be detected by using human body skeleton information, instead of using an existing gesture recognition algorithm.

The feature extraction module 105 may serve to extract temperature information of a human body part, and to extract a feature of a skin temperature of the human body part by using the extracted temperature information. Here, the feature of the skin temperature may include, for example, a feature vector of a skin temperature of a finger, a feature vector related to a temperature difference between a finger and a palm, and a size of a specific frequency region in thermal image information with a converted frequency.

The thermal comfort extraction module 106 may serve to estimate a thermal comfort of a human body through an analysis of a feature of a skin temperature, and to extract thermal comfort information based on the estimated thermal comfort.

The air conditioning control module 107 may serve to control an operation of the air conditioner 100, for example, temperature, humidity, intensity, and direction of air current, based on extracted thermal comfort information of a human body.

When the air conditioner 100 is implemented as one Internet of Things (IoT), a communication unit configured to perform data communication using 5G communication technology may be additionally included in the air conditioner 100.

The communication unit may be configured to include at least one of a mobile communication module and a wireless Internet module. In addition, the communication unit may further include a short-range communication module.

The mobile communication module may transmit and receive a wireless signal to and from at least one among a base station, an external terminal, and a server on a mobile communication network constructed according to technical standards or communication schemes for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and 5G mobile communication).

The wireless Internet module may refer to a module for wireless Internet access, and may be embedded in or provided outside the air conditioner 100. The wireless Internet module may be configured to transmit and receive a wireless signal over a communication network conforming to wireless Internet technologies.

Various air conditioners including the air conditioner 100 may transmit and receive data to and from the server 200 via a 5G network. In particular, the air conditioner 100 may perform data communication with the server 200 via the 5G network by using at least one service among an enhanced mobile broadband (eMBB), ultra-reliable and low latency communications (URLLC), and massive machine-type communications (mMTC).

The eMBB is a mobile broadband service, and multimedia content, wireless data accesses, and the like may be provided through the eMBB. Also, further enhanced mobile services, such as a hotspot and wideband coverage, in order to accommodate rapidly increasing mobile traffic, may be provided through the eMBB. Through the hotspot, a large amount of traffic may be accommodated in an area having a low user mobility and a high density. Through the wideband coverage, a wide and stable wireless environment and user mobility may be guaranteed.

The URLLC service defines requirements that are far more stringent than those of existing LTE, in terms of reliability of data transmission and reception and transmission delay. The URLLC service may correspond to a 5G service for automation of production processes in industrial sites, telemedicine, remote surgery, transportation, safety, and the like.

The mMTC is a service that is not sensitive to a transmission delay which requires transmission of a relatively small quantity of data. A much larger number of terminals than a number of general mobile phones, such as sensors, may simultaneously access a wireless access network via the mMTC. In this case, a communication module of a terminal needs to be inexpensive, and there is a need for a technology for an enhanced power efficiency and power saving to enable operations to be performed for years without battery replacement or recharging.

In a thermal environment, elements that have an influence on a thermal comfort of a human body may include, for example, air temperature, mean radiant temperature (MRT), air velocity, and humidity, and personal elements may include, for example, a metabolic rate and a clothing level (do value).

Thermal comfort may be a state of mind that shows satisfaction toward a thermal environment, and satisfaction means that at least 80% of occupants allow the thermal environment.

A predicted mean vote (PMV), and a predicted percentage dissatisfied (PPD) are typically used as evaluation criteria of an air conditioning comfort.

The PMV was established by the International Organization for Standardization (ISO) 7730 in 1984, and was proposed by Professor Fanger of the Technical University of Denmark. The PMV may be calculated based on (1) an air temperature, (2) a partial water vapor pressure, (3) an MRT, (4) a relative air velocity, (5) a clothing level, and (6) a metabolic rate.

$$PMV=[0.303\exp(-0.036M)+0.028]L$$

Here, M denotes an amount of heat generated from a body, and L denotes a function of a thermal load, and an amount of heat emitted from a human body.

The PMV may be used to predict a clothing level allowing comfort to be obtained under various environmental conditions, or to predict a comfort environment condition under an arbitrary clothing condition. In a temperature environment, a human response is represented by seven reference values (+3: hot, +2: warm, +1: slightly warm, 0: neutral, −1: slightly cool, −2: cool, and −3: cold). A PMV value of −0.5 to +0.5 may indicate a desirable thermal environment.

The PPD represents a percentage of people in the same environment who are thermally dissatisfied with a feeling of hot or cold with respect to the total number of people. A predicted degree of people's dissatisfaction with respect to a thermal environment at a specific point may be known, and may be calculated by the following equation:

$$PPD=100-95e^{-(0.03353PMV^4+0.2179PMV^2)}$$

In addition, there is a contact warm-cool feeling associated with a type of fabric of clothes. The contact warm-cool feeling is a cold or warm sensation felt immediately when touching a fabric. Due to a phenomenon in which heat moves instantly from a warm hand to a fabric, a cool feeling may be felt in a human body when a large amount of heat moves.

When a temperature of a fabric is kept at room temperature, and when the room temperature decreases, an amount of heat moving from a hand to the fabric may increase. Thus, the heat of the hand may be lost, and as a result a cool feeling may be felt in a human body.

When a fabric contains moisture or has a smooth surface, and when a fabric has a dense structure, a large amount of heat may be transferred. When a surface of a fabric has a large number of fine hairs, a small amount of heat may transfer. In summer, a product made of fibers with a high thermal conductivity (hemp fibers) may be preferred.

The world's representative standard for a thermal environment includes the American Society of Heating, Refrigerating and Air-conditioning Engineers (ASHRAE) 55, and the ISO 7730. The ASHRAE 55 and the ISO 7730 were set and amended for the purpose of a high thermal comfort, based on an effective temperature and a PMV, respectively.

In the ISO 7730, an incentive value of a thermal comfort region based on a warm sense/cold sense of an entire body, is shown in connection with the PMV and PPD. Specifically, the PPD is a percentage of people who are dissatisfied by or feel discomfort in the thermal environment.

However, a process of calculating a thermal comfort by using the PMV for air conditioning of a space is complex, and it is not easy to accurately measure factors required for thermal comfort calculation with limited facilities. Thus, there is a need for an alternative to estimate a thermal comfort.

Since a thermal infrared image representing an entire human body shows a simple temperature distribution, it is difficult to estimate a thermal comfort based on an unprocessed thermal infrared image.

According to a thermal comfort-based air conditioning method and an air conditioner using the same according to an embodiment of the present disclosure, thermal comfort felt by a human may be estimated through an AI model that is trained through learning by using an AI algorithm. Hereinafter, a thermal comfort-based air conditioning method according to an embodiment of the present disclosure will be described.

Figure 5:
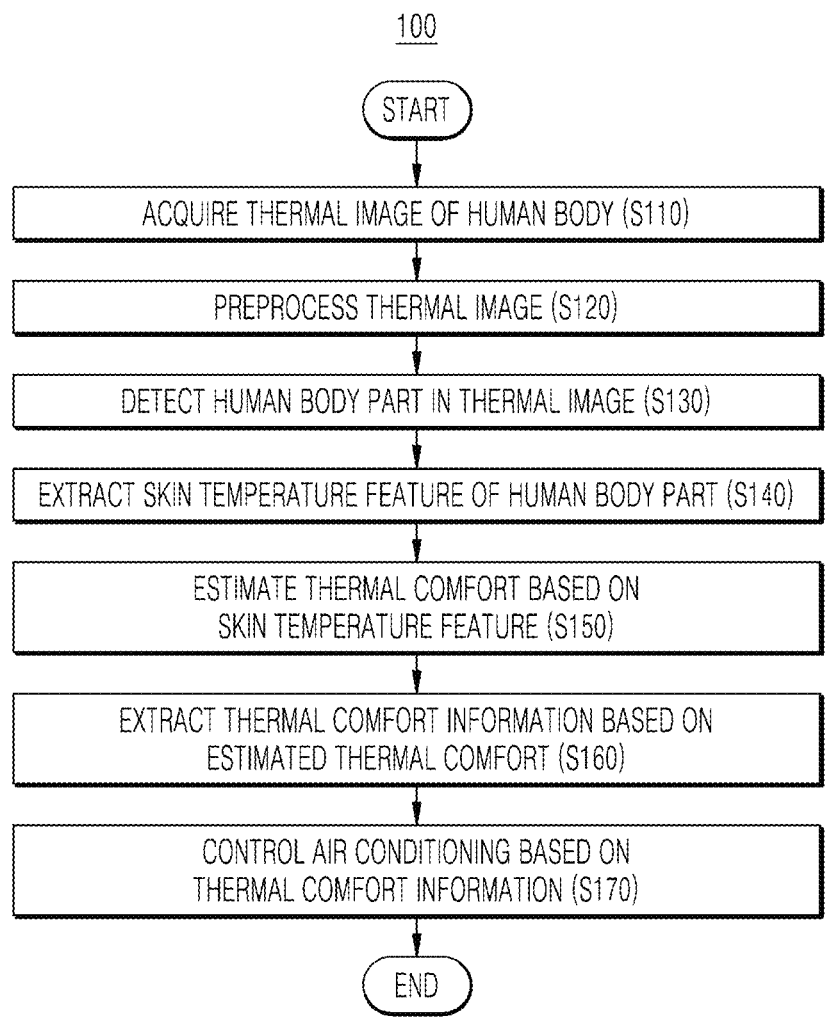
FIG. 5 is a flowchart illustrating an air conditioning method according to an embodiment of the present disclosure.

FIG. 5 is a flowchart illustrating an air conditioning method according to an embodiment of the present disclosure.

Referring to FIG. 5, a thermal comfort-based air conditioning method S100 according to an embodiment of the present disclosure may include steps S110 to S170.

Here, steps of the air conditioning method may be performed by the air conditioner 100, specifically, the air conditioner indoor unit 110, and more specifically the processor 101 that executes a computer instruction for air conditioning control included in a program stored in a memory 102. The processor 101 may be implemented as a microcontroller. Hereinafter, configuration steps will be described in view of the processor 101 according to an embodiment of the present disclosure.

First, the processor 101 may acquire a thermal image of a human body by using a camera (S110). The processor 101 may acquire the thermal image by using a camera included in the air conditioner indoor unit 110 or using a camera independent of the air conditioner indoor unit 110.

The camera may be configured to include a thermal sensor. The thermal sensor may sense light of an infrared region emitted from a human body, and capture a thermal image. The camera may be implemented in the form of a thermal infrared camera, or a thermal infrared camera module, and may be included in the air conditioner indoor unit 110 or in an independent area.

A thermal infrared camera or a thermal infrared camera module may include a lens, a thermal sensor, a filter, a converter, a processor, and a memory. The processor and the memory may be required to process a thermal image, and may be provided separately from the processor 101 and the memory 102 of the air conditioner 100.

Next, the processor 101 may perform a preprocessing step of a thermal image by using a program stored in the memory 102 (S120). For example, when a processor and a memory used for preprocessing are included in a camera, the camera or a camera module, instead of the processor 101, may perform a process of preprocessing the thermal image.

Next, the processor 101 may detect a human body part in the thermal image (S130). Specifically, the processor 101 may sequentially separate and detect human body regions and human body parts, or may simultaneously detect human body regions and human body parts.

In this process, various algorithms for sensing the above-described human body regions and human body parts may be used. The air conditioner 100 may separate a hand part and a forehead part by using various algorithms in a human body region where a background is removed from an acquired thermal image and a motion is captured.

Next, the processor 101 may detect a temperature for each human body part, and may extract a corresponding skin temperature feature by using the detected temperature (S140). For example, the air conditioner 100 may extract, based on the human body part detected at step S130, a skin temperature feature of each of a forehead part and a hand part where a large number of shunt vessels are distributed in a human body.

An image signal representing a skin temperature of a human body part displayed in a time domain may be displayed in a frequency domain through a signal conversion, such as a Fourier transform. Also, a value of a power spectrum of a converted signal may be taken as a feature vector.

In addition, in an embodiment of the present disclosure, scale invariant feature transform (SIFT), histogram of oriented gradient (HOG), Haar, Ferns, local binary pattern (LBP), and modified census transform (MCT) algorithms, which are used in several image recognitions methods, may be used to detect a human body region, detect a human body part, and extract a skin temperature feature.

The air conditioner 100 may extract a finger skin temperature feature of a recognized user, and may extract a feature of a difference in a skin temperature between a finger and a palm, and a feature of a size of a specific frequency region of a frequency-converted signal.

Next, the processor 101 may estimate a thermal comfort based on the skin temperature feature of the human body part (S150). Estimation of a thermal comfort may refer to estimation of whether a human body feels comfortable. For example, when a skin temperature of a body part that is exposed to the outside, instead of being covered by clothes, is lower than a skin temperature of a body part covered by clothes, the processor 101 may estimate that a detected human body is in a state of not being thermally comfortable due to a feeling of cold.

When a skin temperature of a human body part exposed to the outside is higher than a skin temperature of a body part covered by clothes, the processor 101 may estimate that a detected human body is in a state of not being thermally comfortable due to a feeling of hot.

Next, the processor 101 may extract thermal comfort information based on the estimated thermal comfort (S160). The thermal comfort may be extracted as numeric information. For example, even though direct calculation of a PMV is not performed, a result obtained by estimating a thermal comfort may be extracted as thermal comfort information, for example, numerical values such as a PMV.

Next, the processor 101 may perform air conditioning control based on the thermal comfort information (S170). For example, when a human body feels cold or hot, air conditioning control of increasing or lowering a temperature through control of a temperature, a humidity, and an intensity and a direction of an air current.

The air conditioner 100 as an embodiment of the present disclosure may use information about the air conditioner indoor unit 110, and sensing information collected by a sensor, together with a skin temperature feature, in order to estimate a thermal comfort. The sensing information may include, for example, information about a temperature, a humidity, and an intensity and a direction of an air current set in the air conditioner indoor unit 110.

A temperature may include, for example, a temperature of an indoor air conditioning space where the air conditioner indoor unit 110 is installed, and an outdoor temperature of an outdoor space where the air conditioner outdoor unit 120 is installed. The outdoor temperature may be related to a weather of a corresponding day. That is, a quantity of solar radiation may be indirectly estimated based on the outdoor temperature. Also, due to a great difference in temperature between inside and outside on a day with a large quantity of solar radiation, cooling power of the air conditioner 100 often needs to be increased. The outdoor temperature may be analyzed by a thermal sensor installed in the air conditioner outdoor unit 120.

Figure 6:
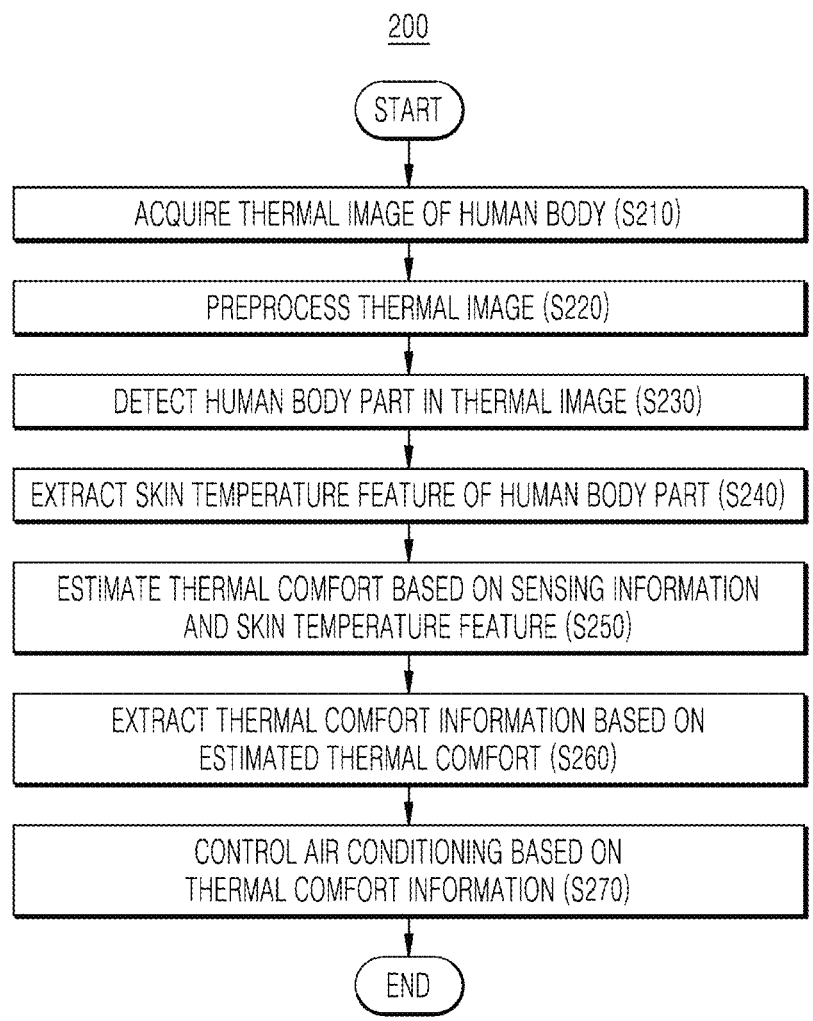
FIG. 6 is a flowchart illustrating an air conditioning method according to an embodiment of the present disclosure.

FIG. 6 is a flowchart illustrating an air conditioning method according to an embodiment of the present disclosure.

Referring to FIG. 6, based on temperature and humidity values measured by a sensor, for example, a thermal sensor and a humidity sensor, and a direction and an intensity of an air current set in the air conditioner indoor unit 110, in addition to a skin temperature feature of a human body part extracted through a process of acquiring a thermal image of a human body (S210), preprocessing the thermal image (S220), detecting a human body part in the thermal image (S230) and extracting the skin temperature feature of the human body part (S240), a thermal comfort may be estimated (S250).

Here, the temperature, the humidity, and the air current may correspond to thermal equilibrium factors associated with a PMV. The temperature, the humidity, and the air current may be reflected on the skin temperature feature. However, since it is difficult to reflect the temperature, the humidity, and the air current within a short period of time, the temperature, the humidity, and the air current may be directly used in estimation of a thermal comfort.

Changing of values related to the temperature, the humidity, and the direction and intensity of the air current from primary setting values of a direction and an intensity of an air current which are set by the air conditioner 100 by using a trained model to secondary setting values which are set by a user may be taken into consideration for estimation of a thermal comfort. For example, according to how primary setting values of the direction and the intensity of the air current changes in secondary setting by the user, a direction and an intensity of an air current which enable thermal comfort of the user to be maintained may be retrieved.

Thermal comfort information may be extracted based on the estimated thermal comfort (S260). Lastly, air conditioning may be controlled based on the thermal comfort information extracted based on sensing information and a skin temperature feature (S270).

A large number of shunt vessels involved in body temperature control are distributed in a hand among various human body parts, and accordingly a thermal conduction in the hand may fast change in comparison with the other body parts.

Figure 7:
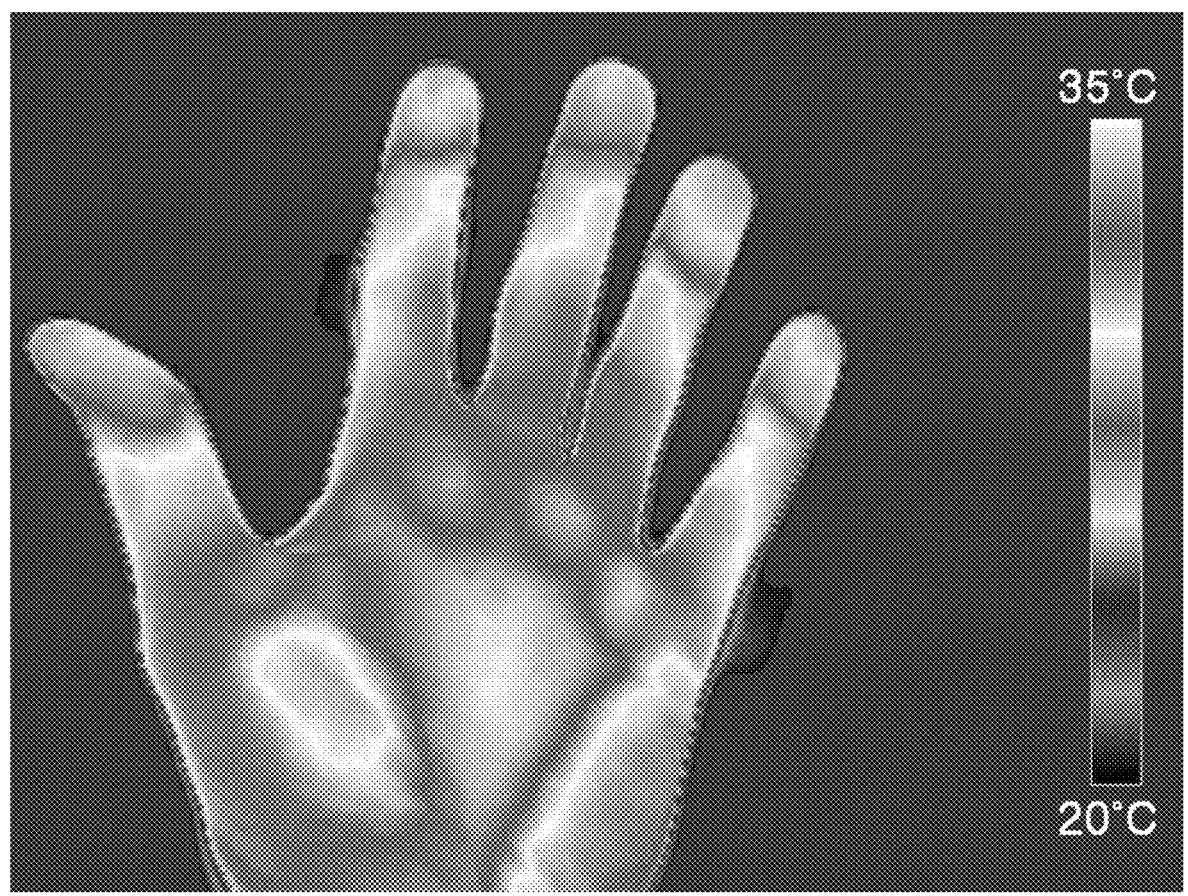
FIG. 7 is a diagram illustrating a thermal image of a human hand according to an embodiment of the present disclosure.

FIG. 7 is a diagram illustrating a thermal image of a human hand according to an embodiment of the present disclosure.

FIG. 7 shows distribution of relatively low temperatures of fingertips in comparison to a palm or a back of a hand. A thermal comfort of a human body may be easily estimated based on a temperature feature of a fingertip.

Figure 8A:
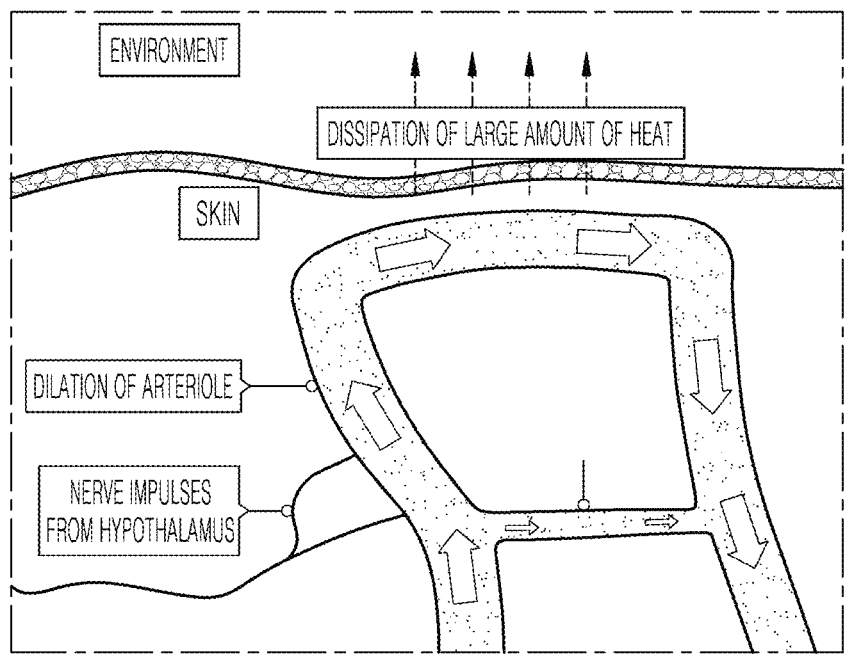
FIG. 8A is an exemplary view illustrating a change in a body temperature associated with thermal comfort.
Figure 8B:
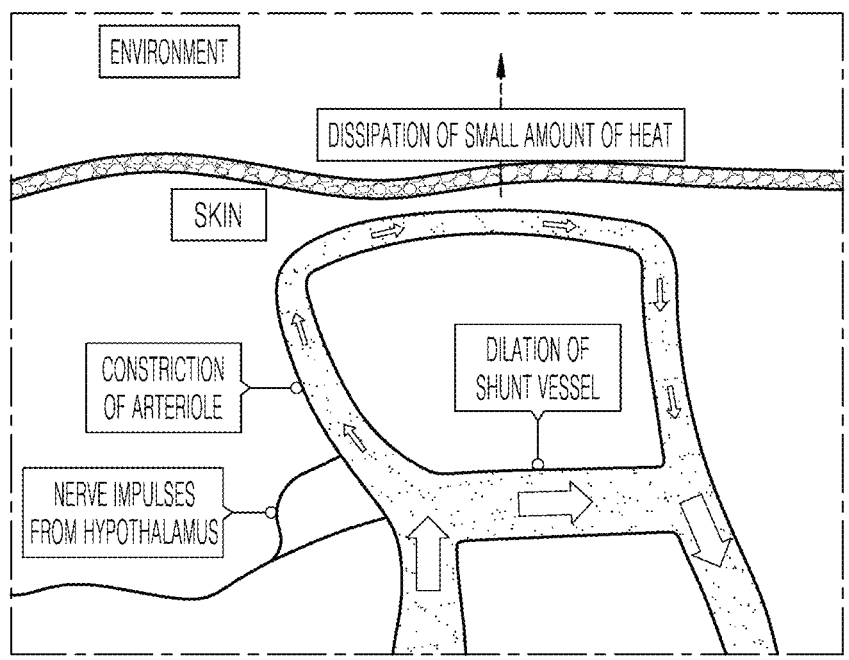
FIG. 8B is an exemplary view illustrating a change in a body temperature associated with thermal comfort.

FIGS. 8A and 8B are exemplary views illustrating a change in a body temperature associated with thermal comfort.

Referring to FIGS. 8A and 8B, capillaries are located directly under a skin, and shunt vessels connected to the capillaries are located far away from the skin. Also, constriction and dilation of the capillaries and shunt vessels may be controlled by nerve impulses from a hypothalamus.

A shunt vessel is referred to as an "arteriovenous anastomosis (AVA)", and is a blood vessel that directly connects an artery and a vein instead of going through a capillary. The above shunt vessel is in a parallel relationship with a capillary, and accordingly a blood flow rate may be regulated according to an interaction between the shunt vessel and the capillary. For example, as an amount of blood flowing in the shunt vessel increases, an amount of blood flowing in the capillary may decrease. On the contrary, as the amount of blood flowing in the shunt vessel decreases, the amount of blood flowing in the capillary may increase.

The number of AVAs existing in a hand and a finger may be significantly greater than that of AVAs existing in the other parts of a surface of a body. When an AVA opens and closes, a hand temperature may change within a wide temperature range. The AVA may be mainly regulated by signals of a hypothalamus, and thus an operation of the AVA may represent an overall body thermal condition.

Blood generally feeds oxygen and nutrients to cells through capillaries, but accepts waste. However, in the shunt vessel, the above material exchange process is omitted.

The capillary is close to the surface of skin, but the shunt vessel is located deep in the skin. Thus, a range of a temperature variation due to a blood flow rate of the capillary, which is more affected by an external temperature than the shunt vessel, may be greater than that of the shunt vessel.

Referring back to FIG. 8A, when a body temperature increases due to a temperature rise, a blood flow rate of the capillary may increase by reducing a blood flow rate of the shunt vessel to increase heat dissipation to the outside, and the heat dissipation to the outside may increase due to an increase in the blood flow rate of the capillary, thereby inhibiting a temperature rise.

Referring back to FIG. 8B, when a body temperature decreases due to a drop in temperature, the blood flow rate of the capillary may decrease by increasing the blood flow rate of the shunt vessel to reduce a heat loss to the outside, and thus the heat loss to the outside may decrease, thereby inhibiting a drop in temperature.

When a temperature at which a human body feels comfortable is different from a temperature of an air conditioning space, the shunt vessel may be involved in temperature control of the human body. Also, when a high blood flow rate needs to be regulated for body temperature control, the human body may feel a feeling of discomfort, instead of thermal comfort. In this case, a sign that the thermal comfort has been lost may appear in a hand of the human body in which shunt vessels are intensively distributed. In addition, as a sign of a thermally uncomfortable feeling felt by the human body, the temperature of a hand part may be higher or lower than those of other parts.

As described above, the shunt vessel may be directly involved in body temperature control according to a warm feeling and cold feeling felt by the human body. Thus, whether thermal comfort of the human body is maintained may be estimated based on a skin temperature feature of a hand where a large number of shunt vessels are distributed, when a temperature of an air conditioning space rises or falls to such an extent that individual thermal comfort is lost due to insufficient or excessive air conditioning.

Figure 9:
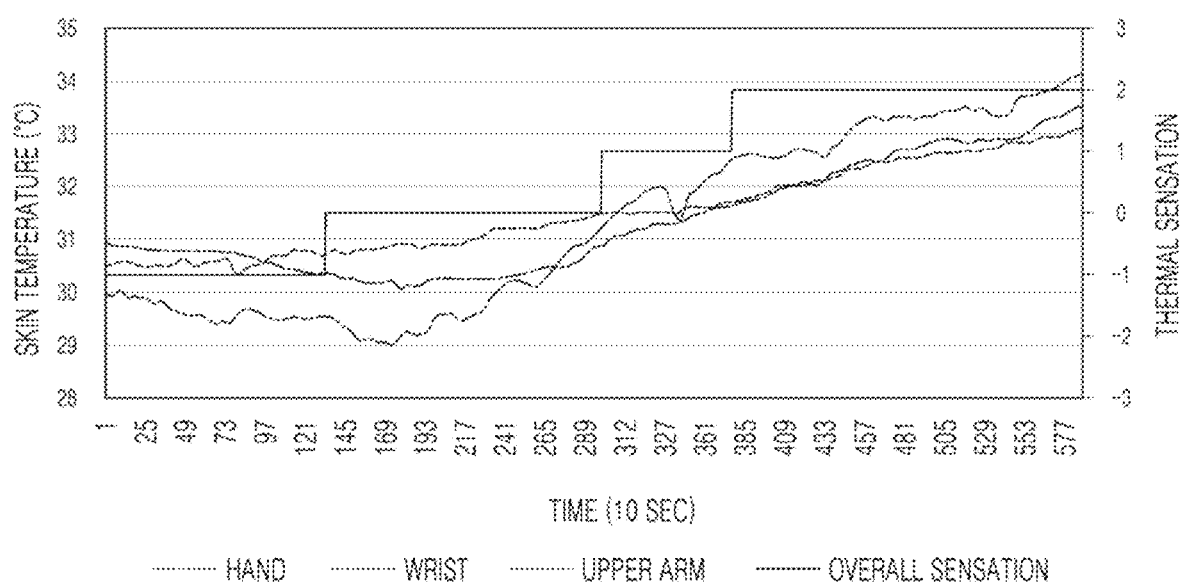
FIG. 9 is a graph illustrating a relationship between a thermal sensation and skin temperatures measured in a hand and body parts around the hand.

FIG. 9 is a graph illustrating a relationship between a thermal sensation and skin temperatures measured in a hand and body parts around the hand.

FIG. 9 illustrates a change in a skin temperature of each of a hand, a wrist, and an upper arm, and an overall sensation felt in a human body, that is, thermal comfort. A feature of a hand skin temperature may indicate a wide variation in body temperature in comparison to the other parts. Thus, when sensing a temperature change of a human body through a thermal image, the temperature change may be easily sensed by focusing on a particular point of the skin of a hand, and detecting a change in temperature at that point.

The thermal comfort-based air conditioning method and the air conditioner using the same according to an embodiment of the present disclosure may be implemented by using an AI algorithm. In particular, step S140 of extracting the skin temperature feature of the human body part, step S150 of estimating a thermal comfort based on the skin temperature feature, and step S250 of estimating the thermal comfort based on sensing information and the skin temperature feature may be performed by an AI model, for example, a deep learning model, which is trained by using training data according to the AI algorithm.

AI is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, an SVM, an artificial neural network (ANN), and so forth.

Decision tree may include an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Figure 10A:
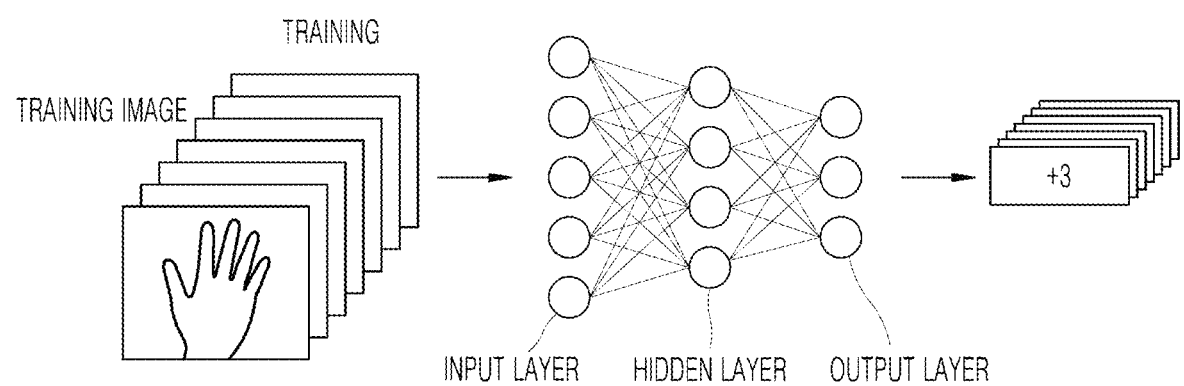
FIG. 10A is an exemplary view illustrating training of an artificial intelligence (AI) model usable in an air conditioning method according to an embodiment of the present disclosure.

FIG. 10A is an exemplary view illustrating training of an AI model usable in an air conditioning method according to an embodiment of the present disclosure.

FIG. 10A schematically illustrates a process of training an AI model that includes a configuration of a training image, a structure of an ANN that performs deep learning, and a labeling scheme that uses thermal comfort information. Exemplary labeling illustrated in FIG. 10A represents a hot state (+3) used in a PMV.

As training images, thermal images including skin temperature information of a human body part may be used. The server 200 may collect, as the training images, user log data of a thermal image acquired from the air conditioner 100 that are used by users. The training image of FIG. 10A represents a hand, but is not limited to the hand. Thermal images that represent a human body by a human body search may be used as training images, and thermal images acquired by cropping each human body part by human body part recognition may be used in extracting a skin temperature feature. As described above, the user log data and the thermal images may become training images through a data mining process.

Thermal images may be inputted to a model that performs learning by using an AI algorithm, for example, an ANN that performs deep learning. The inputted thermal images may pass through an input layer, a hidden layer, and an output layer, so as to extract a feature that may be used as a basis of estimation of a thermal comfort. In addition, when thermal comfort information is given by labeling, the ANN may perform learning using a corresponding training thermal image by comparing and analyzing the thermal comfort information with skin temperature features extracted for each body part, so as to gradually complete a structure of the hidden layer that may be used to estimate labeled thermal comfort information.

The ANN may perform learning by weighting a skin temperature of a body part, for example, a finger, where a large number of shunt vessels are distributed, a difference in a skin temperature between the body part and another body part, for example, a palm, and power of a specific frequency region of a skin temperature on a frequency domain.

Also, the ANN may learn a change in a thermal comfort based on a change in a temperature of bare skin exposed to the outside according to a type of clothes, such as sleeveless clothes, short-sleeve clothes, and long-sleeve clothes.

Furthermore, according to a distribution of skin temperatures of the user based on a thermal image during operation of the air conditioner, the ANN may learn a thermal comfort state of a user by using information about the user's direct control of the air conditioner using a remote control, That is, in a thermal comfort information estimation scenario of the ANN, feedback of a user as well as a thermal image used as an input may be used for learning. For example, when a user performs an active physical activity such as exercise, the user may want stronger cooling. In this case, the ANN may perform learning by weighting a situation in which the user controls a temperature by using a remote control.

As an example of learning, when hot weather is perceived through measured external temperature information, the ANN may perform learning by weighting an analysis of a thermal comfort pattern of a user appearing according to external temperature information.

Figure 10B:
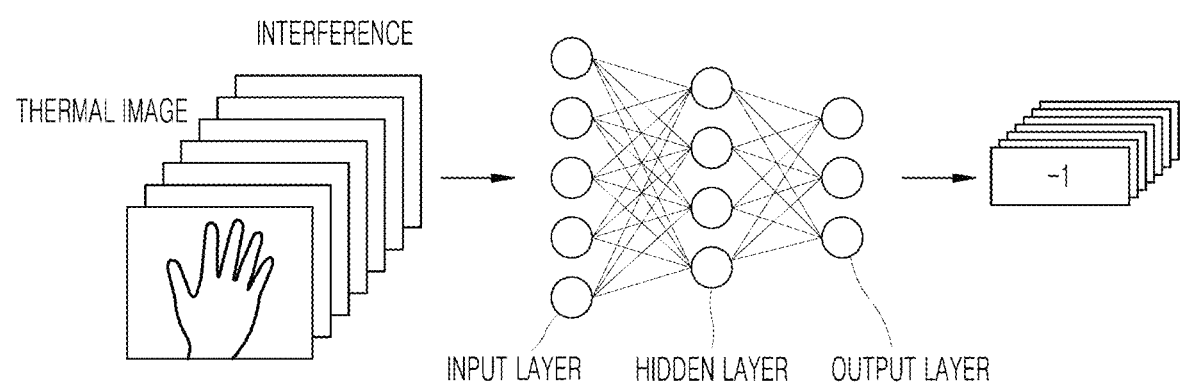
FIG. 10B is an exemplary view illustrating estimation of a thermal comfort by using an AI model that is trained through learning and that may be used in an air conditioning method according to an embodiment of the present disclosure.

FIG. 10B is an exemplary view illustrating estimation of thermal comfort by using an AI model that is trained through learning and that may be used in an air conditioning method according to an embodiment of the present disclosure.

FIG. 10B schematically illustrates a process of inferring or estimating a human body thermal comfort which is performed based on a result obtained by learning of the trained AI model of FIG. 10A, for example, an ANN that performs deep learning.

The processor 101 may estimate a thermal comfort of a human body with respect to an inputted thermal image based on a result obtained by performing learning with the ANN that performs deep learning completed through evaluation.

Through various embodiments of the present disclosure as described above, an air conditioning control method of estimating a thermal comfort of a human body by using a thermal image to satisfy individual thermal comforts based on thermal comfort information extracted based on the estimated thermal comfort may be performed.

In addition, a feeling of discomfort caused by heat or cold due to excessive or insufficient air conditioning control may be prevented.

Furthermore, a state in which each individual feels thermal comfort may be maintained through air conditioning control.

The embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the embodiments described above, and rather intended to include the following appended claims, and all modifications, equivalents, and alternatives falling within the spirit and scope of the following claims.

What is claimed is:

1. A thermal comfort-based air conditioning method comprising:
    acquiring a thermal image of an air conditioning space via an image sensor;

acquiring thermal comfort information of a human body within the air conditioning space based on the thermal image; and controlling air conditioning of the air conditioning space based on the thermal comfort information, wherein the acquiring the thermal comfort information of the human body comprises using an artificial intelligence (AI) model which estimates the thermal comfort information of the human body based on an analysis of a human body skin temperature feature, and wherein the AI model is trained to extract a skin temperature feature based on at least one of a difference in the skin temperature between a finger and a palm, or a value at a pre-defined frequency band of a power spectrum of a converted signal in a frequency domain from the thermal image, and to estimate the thermal comfort information of the human body based on the skin temperature feature.

2. The thermal comfort-based air conditioning method according to claim 1, wherein the acquiring the thermal comfort information of the human body based on the thermal image comprises:

recognizing a human body region in the thermal image;

extracting a skin temperature feature based on a temperature of the human body region;

estimating a thermal comfort of the human body based on an analysis of the skin temperature feature; and extracting the thermal comfort information based on the estimated thermal comfort.

3. The thermal comfort-based air conditioning method according to claim 2, wherein the recognizing the human body region in the thermal image is based on a temperature feature of the human body in motion.

4. The thermal comfort-based air conditioning method according to claim 2, wherein the estimating the thermal comfort of the human body comprises using sensing information about at least one of a temperature, a humidity, or a wind strength.

5. The thermal comfort-based air conditioning method according to claim 2, wherein the estimating the thermal comfort of the human body comprises using a thermal resistance according to a clothing condition of the human body in the thermal image.

6. The thermal comfort-based air conditioning method according to claim 1, wherein the AI model is trained to extract the skin temperature feature based on a thermal resistance according to a clothing condition of the human body, and to estimate the thermal comfort information of the human body based on the skin temperature feature based on the thermal resistance.

7. A thermal comfort-based air conditioner comprising: a thermal sensor configured to acquire a thermal image of an air conditioning space; and a processor configured to:

recognize a human body depicted in the thermal image acquired by the thermal sensor; acquire thermal comfort information of the human body; and control air conditioning of the air conditioning space based on the thermal comfort information, wherein the processor is further configured to utilize an artificial intelligence model (AI) model which estimates the thermal comfort information of the human body based on an analysis of a human body skin temperature feature, and wherein the AI model is trained to extract a skin temperature feature based on at least one of a difference in the skin temperature between a finger and a palm, or a value at a pre-defined frequency band of a power spectrum of a converted signal in a frequency domain from the thermal image, and to estimate the thermal comfort information of the human body based on the skin temperature feature.

8. The thermal comfort-based air conditioner according to claim 7, wherein the processor is further configured to:

extract a skin temperature feature by using a temperature of a human body region in the thermal image;

estimate a thermal comfort of the human body through an analysis of the skin temperature feature; and extract the thermal comfort information based on the estimated thermal comfort.

9. The thermal comfort-based air conditioner according to claim 8, wherein the processor is further configured to recognize the human body region based on a temperature feature of the human body in motion.

10. The thermal comfort-based air conditioner according to claim 8, wherein the processor is further configured to estimate the thermal comfort of the human body based on sensing information about at least one of a temperature, a humidity, or a wind strength.

11. The thermal comfort-based air conditioner according to claim 8, wherein the processor is further configured to estimate the thermal comfort of the human body based on a thermal resistance according to a clothing condition of the human body in the thermal image.

12. The thermal comfort-based air conditioner according to claim 7, wherein the AI model is trained to extract the skin temperature feature based on a thermal resistance according to a clothing condition of the human body, and to estimate the thermal comfort information of the human body based on the skin temperature feature based on the thermal resistance.

* * * * *